US012552692B2

(12) United States Patent
Venkata et al.

(10) Patent No.: US 12,552,692 B2
(45) Date of Patent: Feb. 17, 2026

(54) HYDROGEN WATER DISPENSER FOR REFRIGERATOR APPLIANCES (71) Applicant: Haier US Appliance Solutions, Inc., Wilmington, DE (US)

(72) Inventors: Srikanth Raavi Venkata, Louisville, KY (US); Abdel Hamad, Louisville, KY (US); Umar Siddiqui, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 540 days.

(21) Appl. No.: 17/710,004

(22) Filed: Mar. 31, 2022

(65) Prior Publication Data
US 2023/0312375 A1  Oct. 5, 2023

(51) Int. Cl.
*C25B 1/02* (2006.01)
*C02F 1/461* (2023.01)
*C02F 1/68* (2023.01)
*F25D 23/12* (2006.01)
*C02F 103/02* (2006.01)

(52) U.S. Cl.
CPC .......... *C02F 1/46104* (2013.01); *C02F 1/685* (2013.01); *F25D 23/126* (2013.01); *C02F 2103/02* (2013.01); *C02F 2201/46135* (2013.01); *C02F 2201/4615* (2013.01); *C02F 2209/44* (2013.01); *C02F 2307/12* (2013.01)

(58) Field of Classification Search
CPC .. C02F 1/46104; C02F 1/685; C02F 2103/02; C02F 2201/46135; C02F 2201/4615; C02F 2209/44; C02F 2307/12; F25D 23/126; C25B 1/02
See application file for complete search history.

(56) References Cited

U.S. PATENT DOCUMENTS

| 10,858,743 | B2 | 12/2020 | Lee | |
| 2010/0052193 | A1* | 3/2010 | Sylvester | A01K 63/042 261/26 |
| 2019/0368055 | A1* | 12/2019 | Lee | C25B 15/02 |
| 2020/0361796 | A1 | 11/2020 | Yoo et al. | |

FOREIGN PATENT DOCUMENTS

KR  20170133725 A  12/2017
WO  WO2017043433 A1  3/2017

OTHER PUBLICATIONS

Fuyoshi Co., Ltd., "Portable hydrogen water bottle generator 380ml", https://fuyoshigroup.en.taiwantrade.com/product/1944936.
(Continued)

*Primary Examiner* — Zulmariam Mendez
(74) *Attorney, Agent, or Firm* — Dority & Manning, P.A.

(57) ABSTRACT

A system for infusing hydrogen into water dispensing from a refrigerator appliance includes a tank defining an interior volume no greater than one liter. An electrolysis system includes an anode and a cathode disposed within the interior volume of the tank. The anode and cathode are configured to decompose water within the interior volume of the tank when a voltage differential is applied across the anode and cathode during a hydrogen infusion cycle of the electrolysis system. An audio emitter is configured to emit an audio alert in response to completion of the hydrogen infusion cycle.

13 Claims, 5 Drawing Sheets (56) References Cited

OTHER PUBLICATIONS

Kang et al., "Effects of drinking hydrogen-rich water on the quality of life of patients treated with radiotherapy for liver tumors", Medical Gas Research 1, Article 11, 2011, https://doi.org/10.1186/2045-9912-1-11.

Yao et al., "Intake of Molecular Hydrogen in Drinking Water Increases Membrane Transporters, p-Glycoprotein, and Multidrug Resistance-Associated Protein 2 without Affecting Xenobiotic-Metabolizing Enzymes in Rat Liver", Department of Nutrition, China Medical University, 2019.

* cited by examiner

HYDROGEN WATER DISPENSER FOR REFRIGERATOR APPLIANCES

FIELD OF THE INVENTION

The present subject matter relates generally to refrigerator appliances, and more particularly to systems and methods for dispensing hydrogen water from refrigerator appliances.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber. Certain refrigerator appliances include dispensing assemblies for providing liquid water and/or ice to a user. However, the dispensed liquid water is generally sourced from a municipal water supply or well and is frequently untreated prior to dispensing.

A refrigerator appliance with features to improve dispensed liquid water would be useful.

BRIEF DESCRIPTION OF THE INVENTION

Aspects and advantages of the invention will be set forth in part in the following description, or may be apparent from the description, or may be learned through practice of the invention.

In an example embodiment, a system for infusing hydrogen into water dispensing from a refrigerator appliance includes a tank defining an interior volume no greater than one liter. An electrolysis system includes an anode and a cathode disposed within the interior volume of the tank. The anode and cathode are configured to decompose water within the interior volume of the tank when a voltage differential is applied across the anode and cathode during a hydrogen infusion cycle of the electrolysis system. An audio emitter is configured to emit an audio alert in response to completion of the hydrogen infusion cycle. The tank, the electrolysis system, and the audio emitter are installable within the refrigerator appliance.

In another example embodiment, a method for infusing hydrogen into water dispensing from a refrigerator appliance includes: initiating a hydrogen infusion cycle of an electrolysis system within the refrigerator appliance in response to actuation of a user input at a dispenser of the refrigerator appliance; applying a voltage differential across an anode and a cathode of the electrolysis system during the hydrogen infusion cycle in order to decompose water within an interior volume of a tank; and activating an audio emitter to emit an audio alert in response to completion of the hydrogen infusion cycle. The anode and cathode are positioned within the interior volume, and the interior volume of the tank is no greater than one liter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent (10%) margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
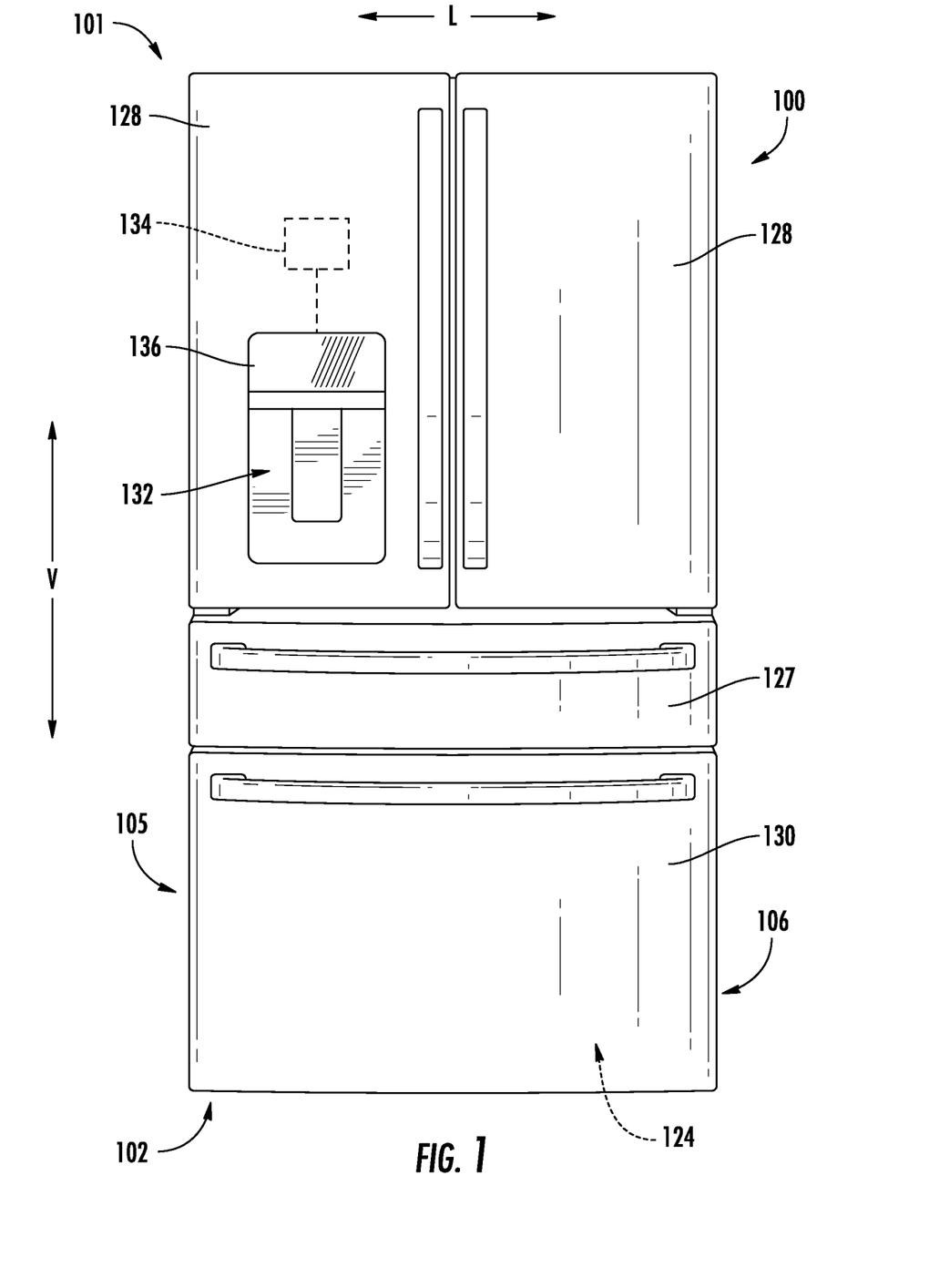
FIG. 1 is a front view of a refrigerator appliance according to an example embodiment of the present subject matter.
Figure 2:
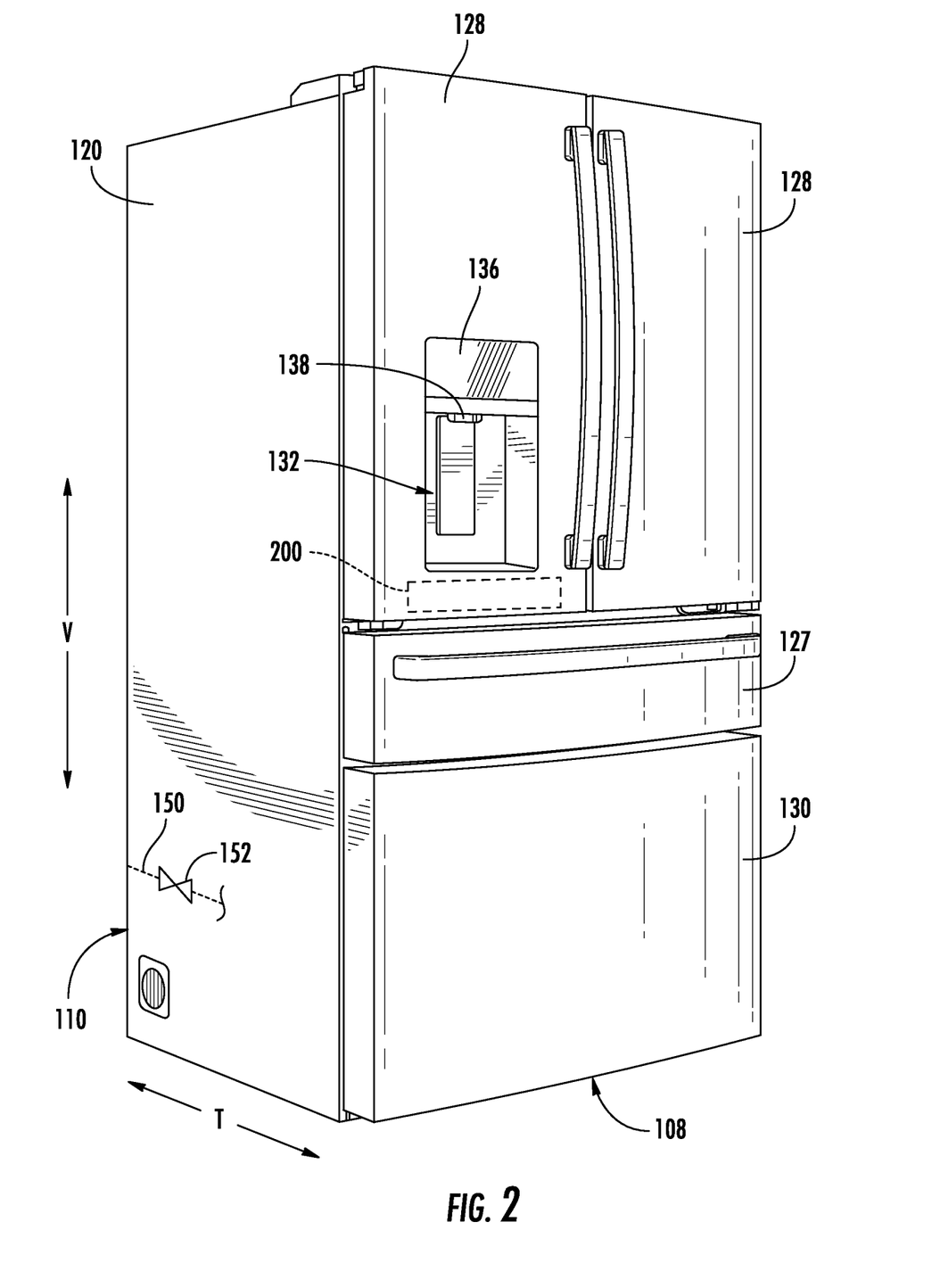
FIG. 2 is a perspective view of the example refrigerator appliance of FIG. 1.
Figure 3:
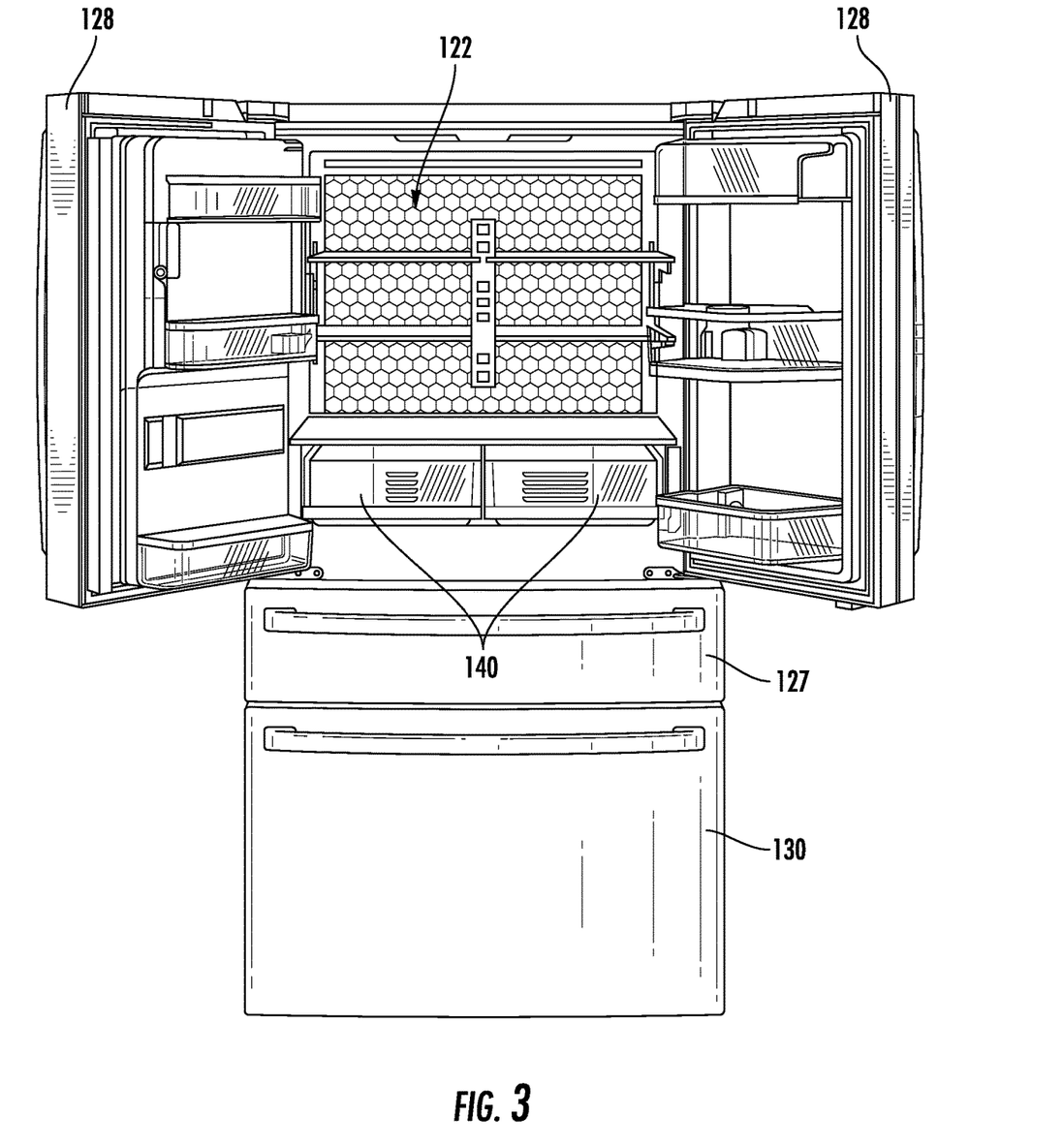
FIG. 3 is a front view of the example refrigerator appliance of FIG. 1 with doors in an open position.

FIG. 1 is a front view of an example embodiment of a refrigerator appliance 100. FIG. 2 is a perspective view of the refrigerator appliance 100. FIG. 3 is a front view of the refrigerator appliance 100 with fresh food doors 128 thereof in an open position. Refrigerator appliance 100 extends between a top portion 101 and a bottom portion 102 along a vertical direction V. Refrigerator appliance 100 also extends between a first side portion 105 and a second side portion 106 along a lateral direction L. As shown in FIG. 2, a transverse direction T may additionally be defined perpendicular to the vertical and lateral directions V, L. Refrigerator appliance 100 extends along the transverse direction T between a front portion 108 and a back portion 110.

Refrigerator appliance 100 includes a cabinet or housing 120 defining an upper fresh food chamber 122 (FIG. 3) and a lower freezer chamber or frozen food storage chamber 122 (FIG. 1) arranged below the fresh food chamber 122 along the vertical direction V. Because the freezer chamber 124 is positioned below the fresh food chamber 122, refrigerator appliance 100 is generally referred to as a bottom mount refrigerator. In an exemplary embodiment, housing 120 also defines a mechanical compartment (not shown) for receipt of a sealed cooling system (not shown). Using the teachings disclosed herein, one of skill in the art will understand that the present technology can be used with other types of refrigerators (e.g., side-by-sides) or a freezer appliance as well. Consequently, the description set forth herein is for illustrative purposes only and is not intended to limit the present subject matter in any aspect.

Refrigerator doors 128 are each rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present subject matter. A freezer door 130 is arranged below refrigerator doors 128 for accessing freezer chamber 124. In the example embodiment, freezer door 130 is coupled to a freezer drawer (not shown) slidably mounted within freezer chamber 124. An auxiliary door 127 is also provided, and the auxiliary door 127 may be slidably mounted within an auxiliary chamber (not shown) which is positioned between the fresh food storage chamber 122 and the freezer chamber 124. As may be seen in FIG. 3, a plurality of food storage drawers 140 may be disposed within the fresh food storage chamber 122. Although not specifically labelled, additional example food storage components such as bins and shelves may also be seen in FIG. 3.

As illustrated in FIG. 2, in some example embodiments, the refrigerator appliance 100 may include a water supply line 150. The water supply line 150 may be configured to couple the refrigerator appliance 100 to a water supply, such as a plumbing system, whereby the water supply line 150 receives water from the water supply and delivers water to various other components of the refrigerator appliance 100, such as an ice maker and/or a water dispenser. The refrigerator appliance 100 may also include a valve 152 which permits flow of water through the water supply line 150 when the valve 152 is in an open position and which prevents or obstructs the flow of water through the water supply line 150 when the valve 152 is in a closed position.

Operation of the refrigerator appliance 100 can be regulated by a controller 134 (FIG. 1) that is operatively coupled to a user interface panel 136. Interface panel 136 provides selections for user manipulation of the operation of refrigerator appliance 100 to modify environmental conditions therein, such as temperature selections, etc. In some example embodiments, user interface panel 136 may be proximate a dispenser assembly 132. In response to user manipulation of the user interface panel 136, the controller 134 operates various components of the refrigerator appliance 100. Operation of the refrigerator appliance 100 can be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated example embodiment, the controller 134 may be located within the door 128. In such example embodiment, input/output ("I/O") signals may be routed between the controller and various operational components of refrigerator appliance 100. In one example embodiment, the user interface panel 136 may represent a general purpose I/O ("GPIO") device or functional block. In one example embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

Using the teachings disclosed herein, one of skill in the art will understand that the present subject matter can be used with other types of refrigerators such as a refrigerator/freezer combination, side-by-side, bottom mount, compact, and any other style or model of refrigerator appliance.

Accordingly, other configurations of refrigerator appliance 100 could be provided, it being understood that the configurations shown in the accompanying FIGS. and the description set forth herein are by way of example for illustrative purposes only.

Figure 4:
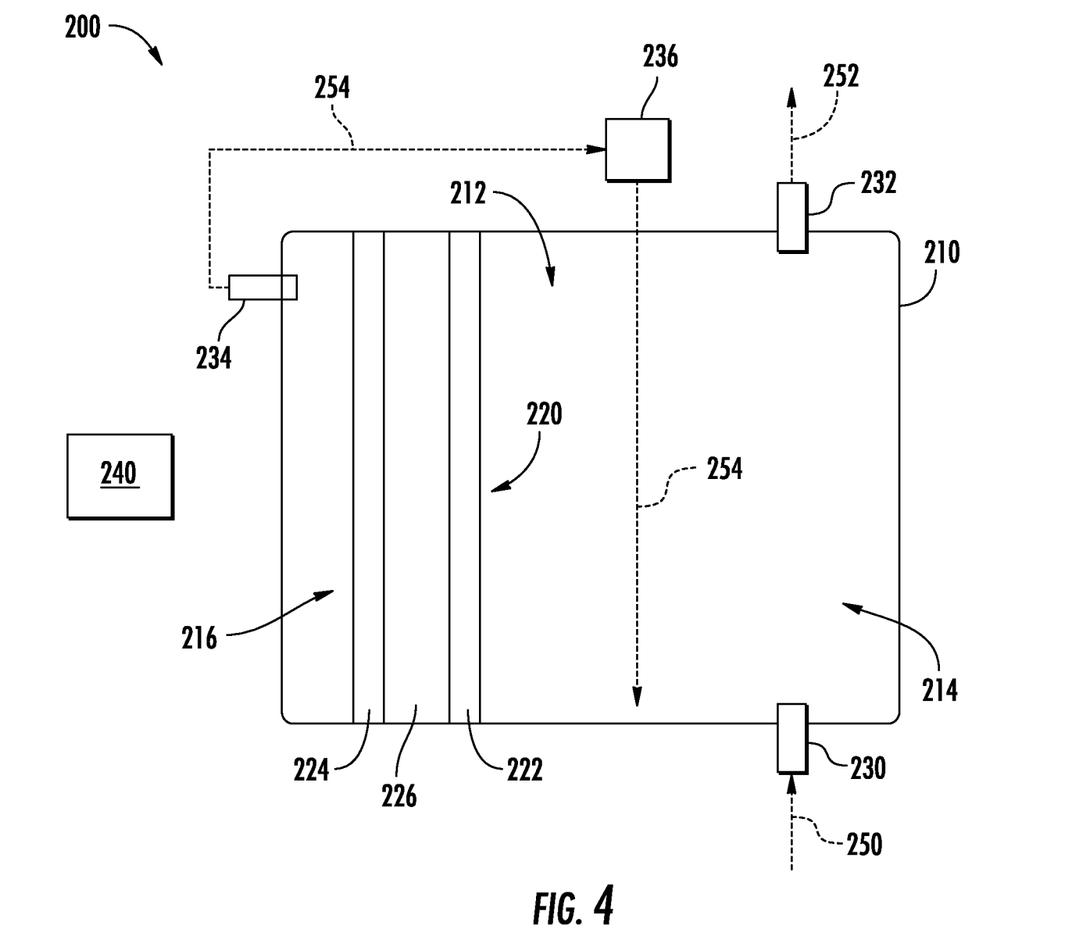
FIG. 4 is a schematic view of certain components of a hydrogen infusion system according to an example embodiment of the present subject matter, and which may be used with the example refrigerator appliance of FIG. 1.

FIG. 4 is a schematic view of certain components of a hydrogen infusion system 200 according to an example embodiment of the present subject matter. Hydrogen infusion system 200 may be installed within refrigerator appliance 100 and may be operable to infuse water flowing to dispenser assembly 132 with molecular hydrogen. Thus, hydrogen infusion system 200 is described in greater detail below in the context of refrigerator appliance 100. However, it will be understood that hydrogen infusion system 200 may be used in or with any other suitable refrigerator appliance in alternative example embodiments.

In certain example embodiments, hydrogen infusion system 200 may be an aftermarket kit installable within refrigerator appliance 100 to infuse water flowing to dispenser assembly 132 with molecular hydrogen. Thus, hydrogen infusion system 200 may be purchased separately from refrigerator appliance 100, and hydrogen infusion system 200 may replace a factory or standard water reservoir within refrigerator appliance 100. For instance, the standard water reservoir may correspond to a spiral tube within the one of fresh food doors 128 with dispenser assembly 132. The spiral tube of the standard water reservoir may contain between about one hundred and twenty milliliters (120 mL) and six hundred milliliters (600 mL). The standard water reservoir may be removed from the one of fresh food doors 128 with dispenser assembly 132, and hydrogen infusion system 200 may be installed in the void left by the standard water reservoir. In alternative example embodiments, hydrogen infusion system 200 may be a factory or standard component of refrigerator appliance 100.

As shown in FIG. 4, hydrogen infusion system 200 includes a tank 210, an electrolysis system 220, and an audio emitter 240. Tank 210 defines an interior volume 212. A capacity of interior volume 212 may be no greater than one liter (1 L) in certain example embodiments. Thus, e.g., tank 210 may contain no more than one liter (1 L) of liquid water therein. As a particular example, interior volume 212 may be about four hundred and fifty milliliters (450 mL). Such small sizing of tank 210 may advantageously allow installation of tank 210 within refrigerator appliance 100, e.g., as an aftermarket component.

Tank 210 may be configured such that water is flowable into interior volume 212 through an inlet 230 of tank 210. In addition, tank 210 may be configured such that the water is flowable out of interior volume 212 through an outlet 232 of tank 210. Inlet 230 may be connected to a supply line 250, such as water supply line 150 (FIG. 2). Outlet 232 may be connected to a dispensing line 252, e.g., that extends from outlet 232 to a spout 138 (FIG. 2) within dispenser assembly 132. Thus, e.g., water from the supply line 250 may flow into interior volume 212 of tank 210, and such water may exit interior volume 212 of tank 210 via dispensing line 252, e.g., and flow to dispenser assembly 132.

Within tank 210, electrolysis system 220 may selectively operate to infuse the water within interior volume 212 with hydrogen. Thus, electrolysis system 220 may infuse the water within interior volume 212 with hydrogen when electrolysis system 220 is activated and performing a hydrogen infusion cycle. Conversely, electrolysis system 220 does not infuse the water within interior volume 212 with hydrogen when electrolysis system 220 is deactivated and not performing the hydrogen infusion cycle. Electrolysis system 220 may be selectively operated based upon user input(s) such that either hydrogen infused water is dispensed through dispensing line 252 or non-hydrogen infused water is dispensed through dispensing line 252. It will be understood that some small amount of molecular hydrogen may be present within water in tank 210 despite electrolysis system 220 being deactivated. Thus, as used herein, the term "hydrogen infused water" may correspond to water with a concentration of molecular hydrogen within the water no less than one part per million (1 ppm), e.g., about one and six-tenths part per million (1.6 ppm).

Electrolysis system 220 may include an anode 222 and a cathode 224. Anode 222 and cathode 224 may be disposed within interior volume 212 of tank 210. Anode 222 and cathode 224 may be configured to decompose water within interior volume 212 of tank 210 when a voltage differential is applied across anode 222 and cathode 224. For instance, anode 222 and cathode 224 may be coupled to a direct current power supply (not shown), which may charge anode 222 and cathode 224. Passing electricity between anode 222 and cathode 224 may decompose water within tank 210 into molecular hydrogen ($H_2$) and oxygen ($O_2$).

As shown in FIG. 4, a polymer electrolyte membrane 226 may be disposed within interior volume 212 of tank 210 between anode 222 and cathode 224. Polymer electrolyte membrane 226 may divide interior volume 212 between a liquid water portion 214 and a hydrogen gas portion 216, in certain example embodiments. The capacity of liquid water portion 214 may be no greater than one liter (1 L) in certain example embodiments. When electrolysis system 220 includes polymer electrolyte membrane 226, tank 210 may include a hydrogen outlet 234 that connects hydrogen gas portion 216 to a hydrogen line 254 extending back into tank 210 (e.g., a bottom of tank 210) on liquid water portion 214. Hydrogen gas exiting hydrogen line 254 within liquid water portion 214 may be infused within the water within tank 210. A check valve 236 on hydrogen line 254 may be configured to prevent water from flowing into hydrogen gas portion 216 via hydrogen line 254.

Audio emitter 240 may be configured to emit an audio alert, such as one or more beeps, buzzes, chirps, tones, etc., in response to electrolysis system 220 completing the hydrogen infusion cycle. For example, audio emitter 240 may alert a user of hydrogen infusion system 200 that hydrogen infused water is available for dispensing after electrolysis system 220 infuses the water within interior volume 212 with hydrogen. Audio emitter 240 may be, e.g., a piezoelectric buzzer. Thus, audio emitter 240 may advantageously be a small, low power component for alerting a user of hydrogen infusion system 200, which may allow installation of audio emitter 240 within refrigerator appliance 100 as an aftermarket component.

Controller 134 (FIG. 1) may be in operative communication with electrolysis system 220 and/or audio emitter 240. Thus, e.g., controller 134 may be configured to selectively activate electrolysis system 220 and initiate the hydrogen infusion cycle, e.g., in response to actuation of an input on user interface panel 136. In addition, controller 134 may be configured to deactivate electrolysis system 220 and terminate the hydrogen infusion cycle. When controller 134 terminates the hydrogen infusion cycle, controller 134 may activate audio emitter 240 in order to alert a user of hydrogen infusion system 200 that hydrogen infused water is ready for dispensing. Controller 134 may be configured to deactivate electrolysis system 220 and terminate the hydrogen infusion cycle after a predetermined period of time from activating electrolysis system 220 and initiating the hydrogen infusion cycle, e.g., in response to actuation of an input on user interface panel 136. The predetermined period of time may be about three minutes (3 m), in certain example embodiments. Thus, controller 134 may be configured to run electrolysis system 220 for the predetermined period of time and then activate audio emitter 240 in order to alert a user of hydrogen infusion system 200 that hydrogen infused water is ready for dispensing.

Figure 5:
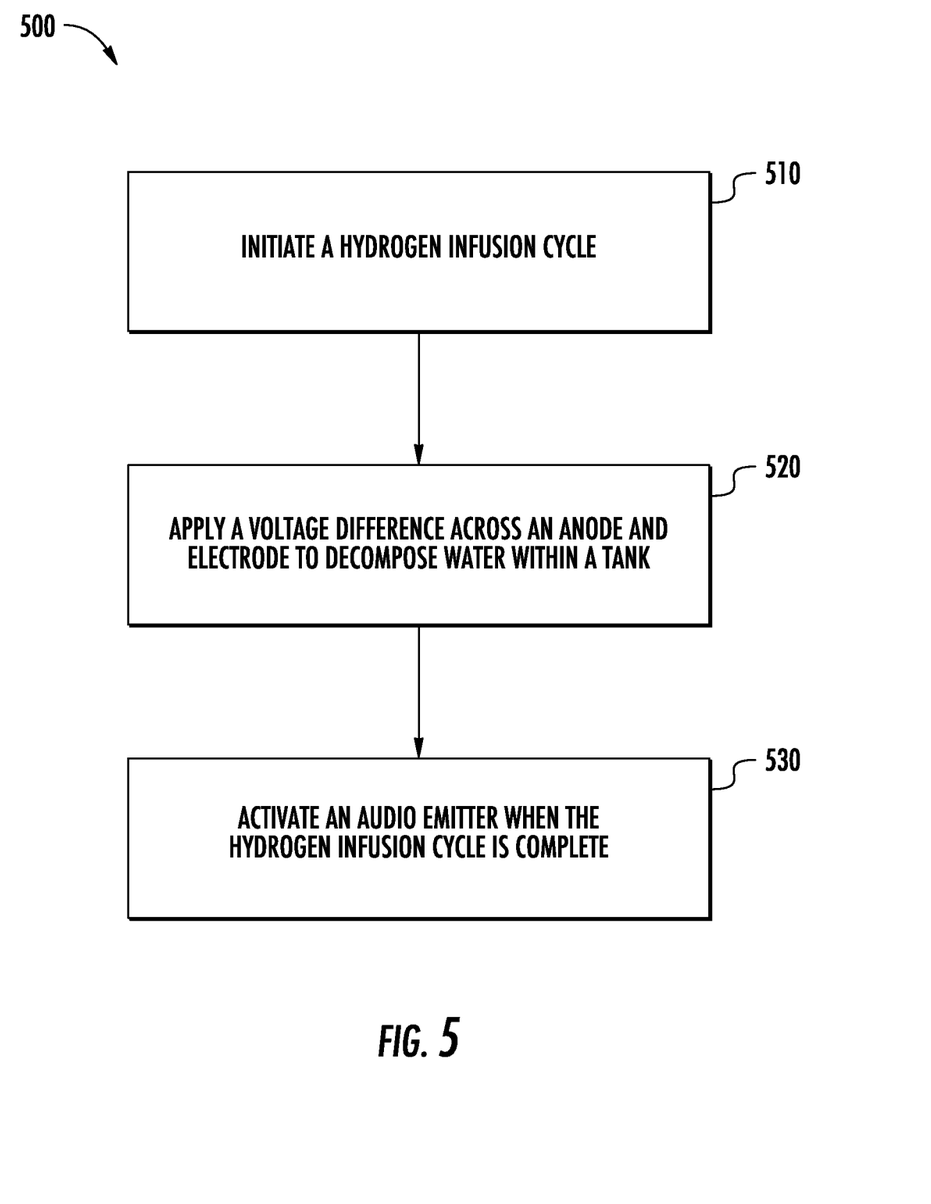
FIG. 5 illustrates an example method for infusing hydrogen into water dispensing from a refrigerator appliance according to an example embodiment of the present subject matter.

FIG. 5 illustrates an example method 500 for infusing hydrogen into water dispensing from a refrigerator appliance according to an example embodiment of the present subject matter. As an example, method 500 may be used in or with hydrogen infusion system 200 to assist with infusing water with molecular hydrogen. Controller 134 may be programmed or configured to implement method 500. While method 500 is described in greater detail below in the context of hydrogen infusion system 200 and refrigerator appliance 100, it will be understood that method 500 may be used in or within any suitable refrigerator appliance in alternative example embodiments.

At 510, a hydrogen infusion cycle of electrolysis system 220 may be initiated within refrigerator appliance 100. For example, controller 134 may initiate the hydrogen infusion cycle in response to actuation of user interface panel 136 at dispenser assembly 132. Moreover, a user may press one or more inputs on user interface panel 136 indicating that the user desires hydrogen infused water at dispenser assembly 132 and corresponding to a trigger for the hydrogen infusion cycle. Controller 134 may then activate electrolysis system 220 to decompose water within interior volume 212 of tank 210 with anode 222 and cathode 224.

At 520, a voltage differential may be applied across anode 222 and cathode 224 of electrolysis system 220 during the hydrogen infusion cycle. For instance, controller 134 may operate electrolysis system 220 at 520 in order to decompose water within interior volume 212 of tank 210. Thus, hydrogen infused water may be generated within interior volume 212 of tank 210 during 520.

At 530, audio emitter 240 may be activated to emit the audio alert in response to completion of the hydrogen infusion cycle. For example, controller 134 may activate audio emitter 240 after generating the hydrogen infused water within interior volume 212 of tank 210 during the hydrogen infusion cycle at 520. A user hearing the audio alert may thus advantageously be informed that the hydrogen infused water is ready for dispensing from tank 210 at dispensing assembly 132.

Method 500 may also include terminating the hydrogen infusion cycle, e.g., simultaneously with or immediately prior to 530. For instance, controller 134 may terminate hydrogen infusion cycle and deactivate electrolysis system 220 after a predetermined period of time from 510. Thus, a duration of the hydrogen infusion cycle may correspond to the predetermined period of time and may be selected to achieve a desired concentration of molecular hydrogen within the water in interior volume 212. The predetermined period of time may be about one minute (1 m), about three minutes (3 m), about five minutes (5 m), etc., in certain example embodiments.

Method 500 may also include actuating a valve, such as valve 152, to regulate water flow through supply line 250 into and out of tank 210. For instance, controller 134 may open valve 152 to flow water from supply line 250 into interior volume 212 of tank 210 via inlet 230. Water entering interior volume 212 may displace hydrogen infused water out of tank 210 through outlet 232 into dispensing line 252 and then dispensing assembly 132. Conversely, controller 134 may close valve 152 to block or limit the flow water from supply line 250 into interior volume 212 of tank 210 via inlet 230.

During the hydrogen infusion cycle, valve 152 may be closed. Thus, valve 152 may block or limit water from supply line 250 from entering interior volume 212 of tank 210 via inlet 230. Conversely, controller 134 may open valve 152 after the hydrogen infusion cycle in order to flow the hydrogen infused water from interior volume 212 to dispensing assembly 132. Moreover, controller 134 may open valve 152 in response to another actuation of user interface panel 136 at dispenser assembly 132. For instance, after hearing the audio alert from audio emitter 240, the user may actuate user interface panel 136 in order to signal controller 134 to being dispensing of the hydrogen infused water from interior volume 212 to dispensing assembly 132 by opening valve 152. After a predetermined time interval, controller 134 may close valve 152 to terminate the flow of water at dispensing assembly 132. The predetermined time interval may be selected to ensure complete dispensing of the hydrogen infused water from interior volume 212 to dispensing assembly 132. As an example, the predetermined time interval may be about fifteen seconds (15 s), in certain example embodiments.

Interior volume 212 of tank 210 may be only partially filled with water at 510. For instance, air may flow into interior volume 212 via dispensing line 252 and fill at least a portion of interior volume 212. For instance, interior volume 212 may be no more than ten percent (10%), no more than five percent, no more than three percent (3%), etc. filled with air at 510. The head space within interior volume 212 at 510 may advantageously allow excess oxygen gas to collect within interior volume 212 during operation of electrolysis system 220. When controller 134 opens valve 152 to dispense the hydrogen infused water from interior volume 212, the air and excess oxygen may first be vented and purged from tank 210 through dispensing line 252 to dispensing assembly 132 prior to flowing the hydrogen infused water to dispensing assembly 132.

FIG. 5 depicts steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure.

As may be seen from the above, the present subject matter may provide an after-market accessory, which can be installed in place of refrigerator water reservoir of a refrigerator appliance to selectively generate and infuse molecular hydrogen into water for various health benefits. For instance, the hydrogen infused water may remove active oxygens and provide other potential benefits. A user may activate the hydrogen infusion system on a dispenser controller panel to trigger the electrolysis process and infuse hydrogen molecules within water. After a period of time (e.g., three minutes), an audio alert indicates to the user that the electrolysis process is complete, and the infused water may be dispensed to the user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
an insulated cabinet defining a chilled chamber;
a door mounted on the cabinet;
a dispenser mounted on the door;
a user input positioned at the dispenser; and
a system for infusing hydrogen into water dispensing from the refrigerator appliance, the system comprising:
a tank defining an interior volume divided into a liquid water portion and a hydrogen gas portion, the liquid water portion being no greater than one liter, the tank comprising a hydrogen outlet and a hydrogen line extending from the hydrogen outlet to the liquid water portion, the hydrogen line being disposed at least in part outside of the interior volume of the tank,
an electrolysis system comprising an anode and a cathode being disposed entirely within the interior volume of the tank, the anode and cathode configured to decompose water within the interior volume of the tank when a voltage differential is applied across the anode and cathode during a hydrogen infusion cycle of the electrolysis system, the electrolysis system further comprising a polymer electrolyte membrane between the anode and the cathode, the polymer electrolyte dividing the interior volume into the liquid water portion and the hydrogen gas portion, and
an audio emitter configured to emit an audio alert in response to completion of the hydrogen infusion cycle,
wherein the tank, the electrolysis system, and the audio emitter are installable within the refrigerator appliance, and
wherein the tank is disposed within the door.

2. The refrigerator appliance of claim 1, further comprising a controller in operative communication with the electrolysis system, the controller configured to initiate the hydrogen infusion cycle in response to actuation of the user input at the dispenser.

3. The refrigerator appliance of claim 2, wherein the controller is configured to terminate the hydrogen infusion cycle and activate the audio emitter after a predetermined period of time.

4. The refrigerator appliance of claim 3, wherein the predetermined period of time is about three minutes.

5. The refrigerator appliance of claim 1, wherein:
the tank is configured such that the water is flowable into the interior volume through an inlet of the tank and the water is followable out of the interior volume through an outlet of the tank;
the inlet is connected to a supply line within the door; and
the outlet is connected to a dispensing line that extends through the door to the dispenser.

6. The refrigerator appliance of claim 2, wherein the tank further comprises a check valve on the hydrogen line.

7. The refrigerator appliance of claim 5, further comprising a controller in operative communication with the electrolysis system,
wherein the controller is configured to apply a voltage differential across an anode and a cathode of the electrolysis system during the hydrogen infusion cycle in order to decompose water within an interior volume of a tank, and
activate the audio emitter to emit an audio alert in response to a completion of the hydrogen infusion cycle.

8. The refrigerator appliance of claim 7, further comprising a valve coupled to the supply line,
wherein the controller is further configured to close the valve during the hydrogen infusion cycle.

9. The refrigerator appliance of claim 8, wherein the controller is further configured to open the valve after the hydrogen infusion cycle in order to flow infused water to the dispenser.

10. The refrigerator appliance of claim 9, wherein opening the valve comprises opening the valve in response to another actuation of the user input at the dispenser of the refrigerator appliance.

11. The refrigerator appliance of claim 9, wherein the controller is further to close the valve after a predetermined time interval from opening the valve.

12. The refrigerator appliance of claim 9, wherein the interior volume is only partially filled with water at a start of the hydrogen infusion cycle, and opening the valve vents gases from the interior volume to the dispenser through the dispensing line before flowing the infused water to the dispenser.

13. The refrigerator appliance of claim 9, wherein a concentration of hydrogen molecules within infused water after the hydrogen infusion cycle is about one and six-tenths parts per million.

* * * * *